United States Patent [19]
Linn

[11] 4,429,624
[45] Feb. 7, 1984

[54] STIRRING ARRANGEMENT

[76] Inventor: Maynard W. Linn, 6336 N. Bergeron, Fresno, Calif. 93704

[21] Appl. No.: 362,022

[22] Filed: Mar. 25, 1982

[51] Int. Cl.³ ............................................. A47J 27/00
[52] U.S. Cl. ...................................... 99/348; 60/527; 366/245; 366/252; 474/273
[58] Field of Search .................. 99/348; 366/244, 245, 366/246, 247, 248, 249, 250, 251, 252, 253; 474/273; 60/527

[56] References Cited

U.S. PATENT DOCUMENTS

| | | | |
|---|---|---|---|
| 4,151,792 | 5/1979 | Nearhood | 99/348 |
| 4,184,779 | 1/1980 | Detmer | 99/348 |
| 4,246,754 | 1/1981 | Wayman | 60/527 |
| 4,305,250 | 12/1981 | Cory | 60/527 |

Primary Examiner—Robert W. Jenkins
Attorney, Agent, or Firm—Don B. Finkelstein

[57] ABSTRACT

This arrangement provides the stirring of the contents of a container. The motive force for the stirring action is supplied by connection of the stirring means to a selected pulley shaft of a pulley arrangement on which an alloy belt of nickel and titanium is placed so that the belt can be cycled through a region of temperature greater than the crystalline phase change temperature of the alloy causing the alloy to attempt to attain its original shape which for a predetermined shape will create a torque on the pulley arrangement and cause the heated portion of the belt to enter a region of temperature less than the crystalline phase change temperature of the alloy where the alloy can be stretched before reentering the region of temperature greater than the crystalline phase change temperature of the alloy.

15 Claims, 4 Drawing Figures

STIRRING ARRANGEMENT

BACKGROUND OF THE INVENTION

1. Field of the Invention

This invention relates to the art of stirring of contents of a container and more particularly to an improved motive force to produce the stirring action.

2. Description of the Prior Art

From the time cooking in a container over a fire was invented, a need to stir the contents thereof has existed. Early implements as a stick, paddle, spoon or such have been used with great success if moved in the container at the appropriate time. The desired movement of the implements has been the source of creative configurations. Such configurations have employed manual or powered means to drive the stirring means. The powered means have usually relied on electrical power as the motive force to drive a motor or create a local magnetic field that have caused a stirring means to move.

Manual implements for pot stirring fill the "cooking" shops. Each type of cooking can be helped with a specialized implement from a wooden spoon to a wok spatula.

The profusion of electric mixers of different sizes and shapes and different modes of movement provide excellent sources for stirring means.

The stirring means has been formed into many shapes such as: a simple rod, a whip composed of a number of wire loops, a paddle with or without holes, a beater composed of two loops of ribbon steel, a set of beaters that intermesh, circular plates with vanes, and a dough hook.

The motion of the stirring means employed in the prior art has been circular, rotary, opposing rotary, one rotary with one stationary and planetary.

The drive train between the motive force and the stirring means has included a direct coupling, a gear train to increase or decrease the speed of movement of the stirring means at either a fixed or variable speed, and possibly a clutch mechanism set to decouple the stirring means from the motive force should the stirring means become jammed.

Containers for cooking have been sized and shaped in a plurality of combinations. The two basic types of containers have been those with a simple cover and those with a locking cover to allow cooking under pressure.

The actual integration of a stirring arrangement with a container has occurred primarily in the field of commercial food preparation or in the scientific laboratory where the benefit of scale allow the apparatus to be economically feasible. Home food preparation activity has been left to combine known inventions such as holding an electric mixer in a container.

The available container stirring arrangements have mostly relied upon electric power which by its nature requires safety of design to guard against injury when working with liquid and heat.

Accordingly, with such a wide variety of containers, lids, coupling means and stirring means the real innovation is to provide a new and useful form of motive power.

It has long been desirable to provide a stirring means for a container in which the entire arrangement can be placed over a source of heat for cooking without the danger of damage to an electric cord or the nuisance of continuous manual participation.

Accordingly, if a motive force that does not rely upon electricity could be combined with the stirring means, the safety impact of such an invention would be great.

The motive force for this invention is the expansion and contraction of a metal alloy as it is cycled through a temperature change. The usual manifestation of this property is expansion when heated and contraction when cooled. However, an alloy of nickel and titanium can be shaped to exhibit an opposite activity due to a crystalline phase change of the alloy. When the alloy is alternately heated and then cooled, the thermo gradiant can allow the nickel, titanium alloy to undergo a change of shape sufficient to produce a motive force.

SUMMARY OF THE INVENTION

Accordingly, it is the object of the present invention to provide an improved arrangement for stirring the contents of a container.

It is another object of the present invention to provide an improved arrangement for stirring the contents of a container particularly adapted for domestic use.

It is another object of the present invention to provide an improved stirring arrangement that is self contained in the lid of the container.

It is yet another object of the present invention to provide an improved arrangement for stirring the contents of a container with a motive force that does not require electrical energy.

The above and other objects of the present invention are achieved, according to a preferred embodiment thereof, by providing a self contained motive force that derives power from the expansion and contraction of a metal belt formed out of an alloy of nickel and titanium.

The alloy of nickel and titanium has the characteristic that it will assume its original shape with great force when heated above the temperature at which the alloy undergoes a crystalline phase change. When cooled below the crystalline phase change temperature the alloy becomes ductile and can be easily formed into a new shape. One shape of the metal belt that takes advantage of this property is a small helix which can be shaped to contract about 30% during the phase change. The metal belt is guided by an arrangement of pulleys first to a region of temperature greater than the crystalline phase change temperature, then to a region less than the crystalline phase change temperature and then cycled back to the region greater than the crystalline phase change temperature. The high temperature region is mounted on the lid of the container so that the heat is provided by the burner over which the container is placed. The low temperature region is mounted in a depression formed in the handle of the lid so that ice and cold water may be placed in the depression to cool the belt. The original shape of the belt can be a tightly wound helix. At room temperature the helix can be stretched. As a portion of the stretched helix is heated above the cyrstalline phase change temperature, the belt will contract as it attempts to attain its original shape which in this example is a tightly wound helix. The contraction of the heat creates a torque on the pulley system that causes the pulley system to rotate. The pulley system carries the contracted portion of the belt to the lower temperature region where the belt will be cooled below the phase change temperature and can be stretched.

The belt will continue to cycle through the temperature regions and thus provide a motive force that can be utilized to turn a stirring means in a container.

DESCRIPTION OF THE DRAWING

The above and other embodiments of the present invention are more fully understood from the following detailed description, taken together with the accompanying drawing, wherein similar reference characters refer to similar elements throughout, and in which.

PREFERRED EMBODIMENT

The motive force for the invention utilizes an alloy of nickel and titanium. The alloy is composed of 45 to 46% nickel and 54 to 55% titanium. The preferred make-up of the alloy is 45% nickel and 55% titanium.

The alloy is formed into a wire with nominal diameter of 0.020 inches. The wire is used to make a belt in original shapes such as a small helix with outside diameter in the range of 0.1 to 0.15 inches or a flat ribbon in a zig zag pattern with a width in the range of 0.1 to 0.2 inches.

When the alloy is made up of the preferred composition, the crystalline phase change temperature is within the temperature range of liquid water. The exact temperature of the crystalline phase change is very sensitive to the purity of the alloy and the percentage make up of the alloy. As the percentage of titanium in the alloy is increased the crystalline phase change temperature can exceed 100° C.

When the alloy is at a temperature below the crystalline phase change, its shape can be changed. For example the belt can be stretched from its original coiled shape to a shape in which the coils are farther apart. The preferred alloy can be reshaped at room temperature, but if the shape is drastically changed, the alloy will not return to its original shape upon being heated above the crystalline phase change temperature.

The motive force can be generated by the contraction of the belt from a stretched shape to its original shape as the alloy undergoes a crystalline phase change. This motive force can be made continuous if the belt is cycled through hot and cold regions and stretched while the belt is passing through the cold region.

The method used by the invention to achieve a cyclic heating and cooling of the belt is to form the belt into a loop and mount the belt loop on a pulley arrangement. The belt can then move so that a portion of the belt is heated to a temperature above the crystalline phase change threshold while another portion of the belt is cooled below the crystalline phase change temperature. The efficiency and power derived from the belt is improved when the belt is cycled through hot and cold portions that differ in temperature by at least 70° C.

Figure 1:
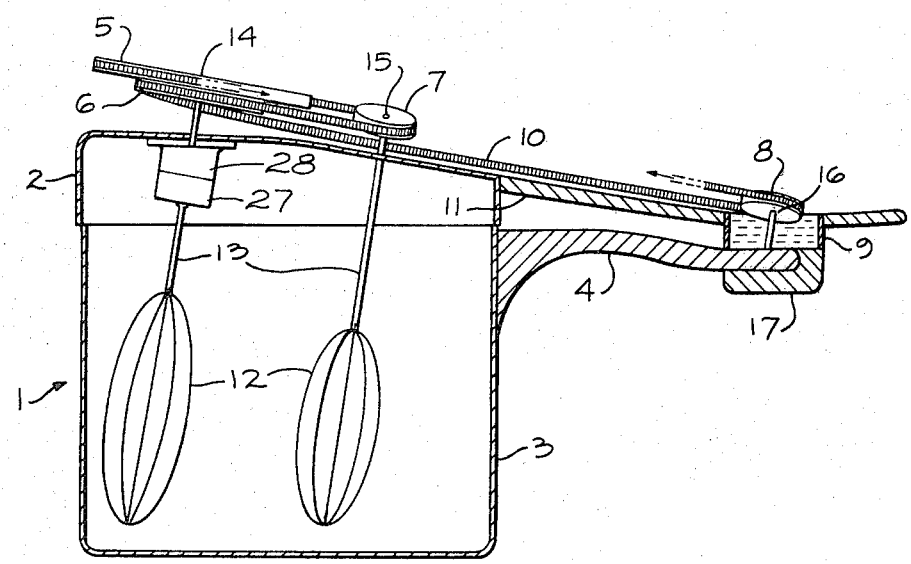
FIG. 1 is a cross sectional view of a preferred embodiment of the present invention.

The container stirring arrangement 1 depicted by FIG. 1 can be mounted on the lid 2 and handle 11 of a conventional cooking container 3 or on the lid and handle of a pressure cooker. The placement of the axis in mounting the pulleys 7 and 8 on the lid 2 and handle 11 can be varied to maximize the efficiency of the stirring for selected mediums such as soup or pudding. The shape of the stirring means can be adapted to the particular purpose and shape of the container such as cooking cereals or sauces.

A pair of pulleys 5 and 6 are attached to each other, are coaxially mounted on a common axle 14, and are rotatable. Pulley 5 has a first diameter selected for the size and shape of the continer 3 and lid 2 upon which it is to be mounted. Pulley 6 has a second diameter smaller than the first diameter. Each pulley 5 and 6 is grooved to accept the shaped drive belt 10 so that the belt inparts rotary motion to the pulleys 5 and 6 when the belt contracts.

A take-up idler pulley 7 is mounted on shaft 15 for rotation. Shaft 15 is mounted on the lid 2 apart from the pair of grooved pulleys 5 and 6. The shaft 15 is disposed at a slant to facilitate the transition of the belt 10 from grooved pulley 5 to grooved pulley 6.

A return idler pulley 8 is mounted on shaft 16 for rotation. Shaft 16 is mounted on the handle 11 of the lid 2 at a point remote from the lid 2. The shaft 16 is slanted in the opposite direction of shaft 15 to facilitate the transition of the belt 10 from grooved pulley 6 to grooved pulley 5.

The container handle 4 can engage the lid handle 11 so that a lip 17 will hold the lid 2 and container 3 together to allow the container 3 and lid 2 to be moved safely.

Figure 3:
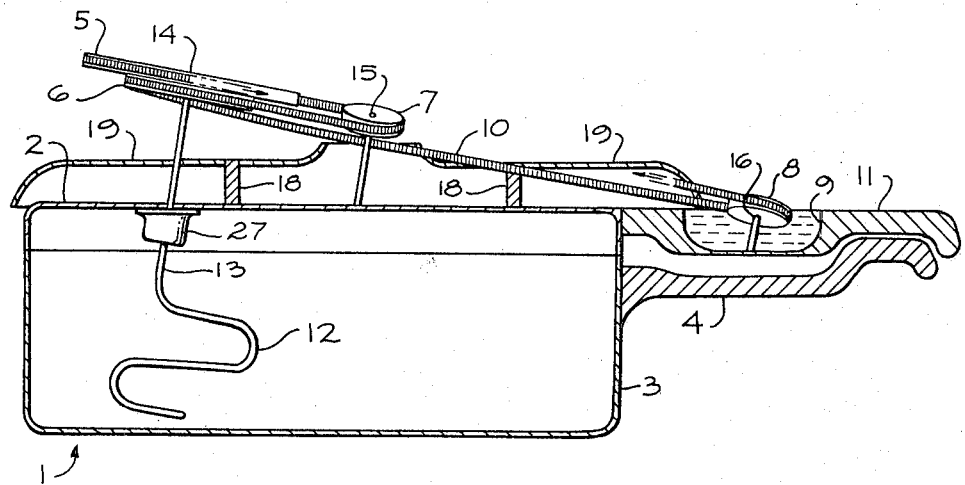
FIGS. 3 and 4 are cross sectional views of a preferred embodiment of the present invention.

FIG. 3 shows a configuration of the lid handle 11 and the container handle 4 that allows both handles 11 and 4 to be held together to safely move the stirring arrangement 1.

The selected connecting means 13 for connecting the axle 14 or shaft 15 to a stirring means 12 that extends into the container 3 can include a clutch 27 that will disengage the stirring means 12 from the motive force if the stirring means 12 experiences a predetermined level of resistance to its rotation. The magnitude of this resistance will depend upon the size, shape and nominal purpose of the selected stirring means 12.

FIG. 1 shows the selected stirring means 12 extending into the container 3 and attached by a selected connecting means 13 to the common axle 14 of the grooved pulleys 5 and 6. The stirring means 12 could be attached to the shaft 15 of the take-up pulley 7. If attached to the take-up pulley 7 a clutch 27 may not be necessary because the belt 10 slippingly engages the take-up pulley 7 so that should the stirring means 12 become jammed, the belt 10 would slip around the take-up idler pulley 7.

The selected connecting means 13 for connecting the axle 14 or shaft 15 to a stirring means 12 that extends into the container 3 can also include a gear train 28 to reduce or increase the speed of the selected stirring means 12 to a predetermined rate of rotation. The magnitude of the rate of rotation will depend upon the size, shape and nominal purpose of the selected stirring means 12.

A stirring arrangement 1 could be constructed to accept a stirring means 12 being attached by a selected connecting means 13 to the common axle 14 and to the shaft 15 with both stirring means 12 extending into the container to stir the contents thereof.

When the stirring arrangement 1 is placed so that heat is input to the container 3 the temperature of the take-up idler pulley 7 will increase. As the belt 10 travels from the grooved pulley 5 to grooved pulley 6 around the take-up idler pulley 7 the belt will absorb thermal energy from the take-up idler pulley. The temperature of the take-up idler pulley 7 must be raised to a predetermined temperature above the crystalline phase change temperature in order to transfer sufficient thermo energy to the belt 10 to cause the belt to achieve the temperature sufficient to undergo the crystalline phase change and attempt to assume its original configuration.

This first predetermined temperature will depend upon the rate at which the belt 10 cycles for the given configuration of container 3 size, shape and nominal purpose.

The return pulley 8 is cooled by a coolant substance 20 such as water and ice contained in a receptical 9 formed in the lid handle 11. As the belt 10 travels from grooved pulley 6 to grooved pulley 5 around the return idler pulley 8, the return idler pulley 8 and coolant substance 20 will absorb thermal energy from the belt 10 so that the belt 10 will decrease in temperature below the crystalline phase change temperature and will stretch.

The return pulley 8 must be cooled to a second predetermined temperature so that in combination with the coolant substance 20 sufficient thermal energy will be absorbed from the belt 10 to decrease the temperature of the belt 10 below the crystalline phase change temperature. The level of this second predetermined temperature will depend upon the rate at which the belt 10 cycles for the given configuration of container 3 size, shape and nominal purpose as well as the capacity of the receptical 9.

The efficiency of the motive force for the stirring arrangement 1 is increased if the difference between the first predetermined temperature and the second predetermined temperature is at least 70° C.

After the belt 10 is cooled by the return pulley 8 and is traveling around grooved pulley 5, the temperature of the belt 10 should not be raised above the crystalline phase change temperature. The contraction of a portion of the belt to generate torque for movement should take place after the belt disengages grooved pulley 5 to move around the take-up pulley 7 and before the belt engages grooved pulley 6. Thus, the temperature of the pair of grooved pulleys 5 and 6 should be maintained below a third predetermined temperature so as not to heat the belt above the crystalline phase change temperature. The level of this third predetermined temperature will depend upon the size and placement of the pair of grooved pulleys 5 and 6 and the size and shape of the container 3 and lid 2.

Figure 4:
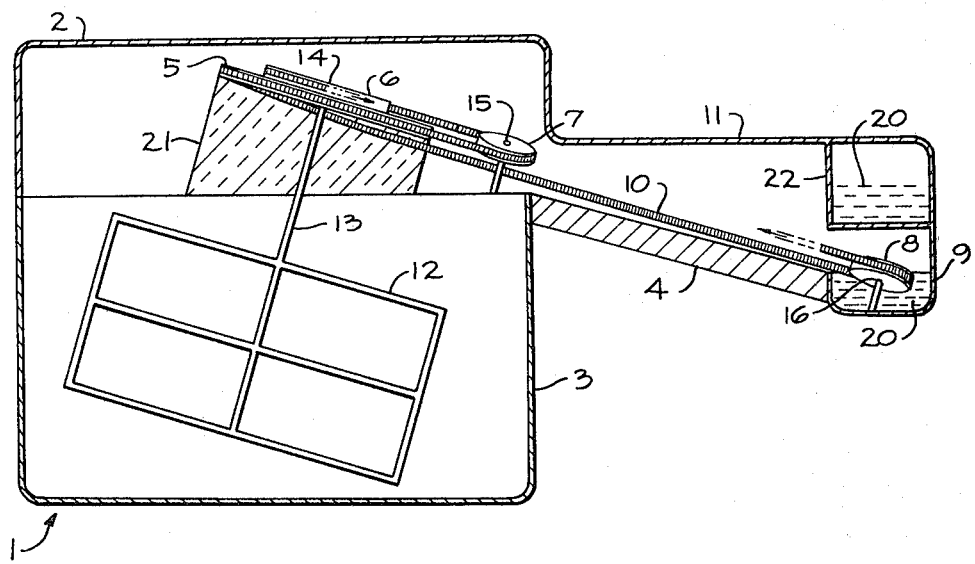

Now referring to FIG. 4 insulating material 21 can be utilized to control the temperature of the pair of grooved pulleys 5 and 6 below the third predetermined temperature. Further, the pair of grooved pulleys 5 and 6 can be made of non-heat conductive material as part of the temperature control.

When the belt 10 is installed over the pulley arrangement, it should be stretched slightly when placed around the take-up pulley 7 with the remaining belt stretched more as it is installed over the return pulley 8 but not stretched to a point that prevents the belt from returning to its original shape. The length of the belt will depend upon the size and placement of the pair of grooved pulleys 5 and 6, the take-up idler pulley 7 and the return pulley 8.

Figure 2:
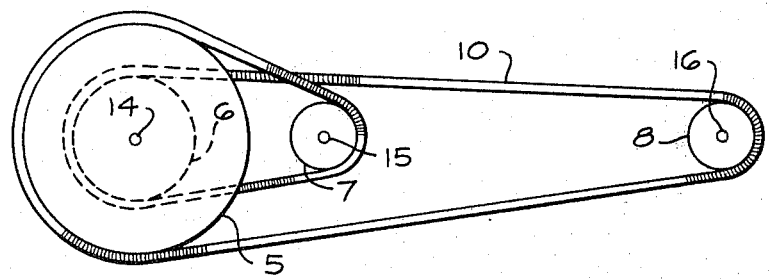
FIG. 2 is a top plan view of a preferred embodiment of the present invention.

The operation of the motive force is shown in FIG. 2. When a portion of belt 10 traveling between pulleys 5 and 6 around the take-up pulley 7 contracts it will pull with equal force on grooved pulley 5 and grooved pulley 6. Because grooved pulley 6 has a smaller diameter the torque exerted by the belt on grooved pulley 5 is larger than the torque exerted on grooved pulley 6. As the grooved pulleys 5 and 6 are attached together, the larger torque on grooved pulley 5 will rotate the grooved pulley combination in the direction of this larger torque. This rotation of the pair of grooved pulleys 5 and 6 will cause the belt 10 that is engaged in the grooved pulleys 5 and 6 to move. As the belt 10 moves around grooved pulley 6, it will rotate to the return pulley 8 to release thermo energy, stretch and then rotate back to grooved pulley 5. After the belt has rotated around grooved pulley 5 it will engage the take-up idler pulley 7, absorb thermo energy and contract. The cycle is complete under the conditions of heat input to the container 3 and a coolant substance 20 contained in the receptical 9.

The return pulley 8 can be surrounded by a screen 22 to prevent the return pulley 8 from becomeing jammed with a solid coolant substance 20 such as ice.

FIG. 3 shows a baffle 19 attached by mounts 18 to the lid 2 whereby the baffel 19 that directs the heat rising around the edges of the container 3 under the conditions of heat input to the container 3 to heat the take-up idler pulley 7.

Since certain changes may be made by those skilled in the art to the above provided stirring arrangement, the many variations and adaptations thereof and of the appended claims are intended to be covered as variations and adaptations falling within the true scope and spirit of the invention.

We claim:

1. In an improved stirring arrangement, the improvement comprising, in combination:

a container for containing materials to be stirred, a handle for said container, a lid for said container, a handle for said lid, a pair of grooved pulleys mounted on the lid for rotational movement, a first of said pair of grooved pulleys having a first diameter, the second of said pair of grooved pulleys having a second diameter smaller than the first diameter, and said pair of grooved pulleys mounted on a common axle, a belt means engaging the grooves of the pair of pulleys to impart rotary motion thereto comprised of an alloy of nickel and titanium, said belt having a predetermined configuration, a take-up idler pulley mounted on the lid for rotational movement spaced apart from said pair of grooved pulleys to direct said belt from said first grooved pulley to said second grooved pulley, said take-up idler pulley mounted on a first shaft, said take-up idler pulley increasing in temperature above a predetermined first temperature whereby said take-up idler pulley transfers thermal energy to said belt to increase the temperature of said belt above the crystalline phase change temperature of said alloy comprising said belt for the condition of the container subjected to heat input, a return idler pulley mounted on said handle for rotational movement to direct said belt from said second grooved pulley to said first grooved pulley, said return idler pulley mounted on a second shaft, means to decrease the temperature of said return idler pulley below the predetermined second temperature whereby said return idler pulley absorbs thermal energy from said belt whereby said belt is reduced in temperature below the crystalline phase change temperature of said alloy comprising said belt, stirring means extending into the container for stirring the contents of said container, and coupling means for coupling said stirring means to said first shaft.

2. In an improved stirring arrangement, the improvement comprising, in combination:

a container for containing materials to be stirred, a handle for said container, a lid for said container, a handle for said lid, a pair of grooved pulleys mounted on the lid for rotational movement, a first of said pair of grooved pulleys having a first diameter, the second of said pair of grooved pulleys having a second diameter smaller than the first diameter, and said pair of grooved pulleys mounted on a common axle, a belt means engaging the grooves of the pair of pulleys to impart rotary motion thereto comprised of an alloy of nickel and titanium, said belt having a predetermined configuration, a take-up idler pulley mounted on the lid for rotational movement spaced apart from said pair of grooved pulleys to direct said belt from said first grooved pulley to said second grooved pulley, said take-up idler pulley mounted on a first shaft, said take-up idler pulley increasing in temperature above a predetermined first temperature whereby said take-up idler pulley transfers thermal energy to said belt to increase the temperature of said belt above the crystalline phase change temperature of said alloy comprising said belt for the condition of the container subjected to heat input, a return idler pulley mounted on said handle for rotational movement to direct said belt from said second grooved pulley to said first grooved pulley, said return idler pulley mounted on a second shaft, means to decrease the temperature of said return idler pulley below the predetermined second temperature whereby said return idler pulley absorbs thermal energy from said belt whereby said belt is reduced in temperature below the crystalline phase change temperature of said alloy comprising said belt, stirring means extending into the container for stirring the contents of said container, and coupling means for coupling said stirring means to said common axle.

3. In an improved stirring arrangement, the improvement comprising, in combination:

a container for containing materials to be stirred, a handle for said container, a lid for said container, a handle for said lid, a pair of grooved pulleys mounted on the lid for rotational movement, a first of said pair of grooved pulleys having a first diameter, the second of said pair of grooved pulleys having a second diameter smaller than the first diameter, and said pair of grooved pulleys mounted on a common axle, a belt means engaging the grooves of the pair of pulleys to impart rotary motion thereto comprised of an alloy of nickel and titanium, said belt having a predetermined configuration, a take-up idler pulley mounted on the lid for rotational movement spaced apart from said pair of grooved pulleys to direct said belt from said first grooved pulley to said second grooved pulley, said take-up idler pulley mounted on a first shaft, said take-up idler pulley increasing in temperature above a predetermined first temperature whereby said take-up idler pulley transfers thermo energy to said belt to increase the temperature of said belt above the crystalline phase change temperature of said alloy comprising said belt for the condition of the container subjected to heat input, a return idler pulley mounted on said handle for rotational movement to direct said belt from said second grooved pulley to said first grooved pulley, said return idler pulley mounted on a second shaft, means to decrease the temperature of said return idler pulley below the predetermined second temperature whereby said return idler pulley absorbs thermal energy from said belt whereby said belt is reduced in temperature below the crystalline phase change temperature of said alloy comprising said belt, stirring means extending into the container for stirring the contents of said container, coupling means for coupling said stirring means to said first shaft, a second stirring means extending into the container for stirring the contents of said container, and a second coupling means for coupling said second stirring means to said common axle.

4. A stirring arrangement described in claim 1 which further comprises engageable locking means for securing said lid to said container for the condition of the contents of the container subjected to greater than atmospheric pressure.

5. A stirring arrangement described in claim 2 which further comprises engageable locking means for securing said lid to said container for the condition of the contents of the container subjected to greater than atmospheric pressure.

6. A stirring arrangement described in claim 3 which further comprises engageable locking means for securing said lid to said container for the condition of the contents of the container subjected to greater than atmospheric pressure.

7. A stirring arrangement described in claim 1, 2, 3, 4, 5 or 6 which further comprises a baffel mounted on said lid whereby the baffel directs heated air that is rising around the edge of the container to flow over said take-up idler pulley.

8. A stirring arrangement described in claim 1, 2, 3, 4, 5 or 6 wherein the means to decrease the temperature of said return idler pulley is a receptical mounted in said handle for said lid remote form said lid and disposed so that said return idler pulley and said second shaft can be mounted in the receptical for decreasing the temperature of the return idler pulley for the condition of the receptical containing a coolant substance.

9. A stirring arrangement described in claim 1, 2, 3, 4, 5 or 6 wherein the means to decrease the temperature of said return idler pulley is a receptical mounted in said handle for said lid remote form said lid and disposed so that said return idler pulley and said second shaft can be mounted in the receptical for decreasing the temperature of the return idler pulley for the condition of the receptical containing a coolant substance, and a screen surrounding said return idler pulley whereby said screen will shield said return idler pulley from being jamed for the condition of solid coolant substance being present in said receptical.

10. A stirring arrangement described in claim 1, 2, 3, 4, 5 or 6 which further comprises insulation means to protect said pair of grooved pulleys from increasing to a predetermined third temperature.

11. A stirring arrangement described in claim 1, 3, 4 or 6 wherein said coupling means comprises a clutch means for disengaging said first shaft from said stirring means for the condition that the stirring means encounters a predetermined magnitude of resistance to rotation.

12. A stirring arrangement described in claim 2, 3, 5 or 6 wherein said coupling means comprises a clutch means for disengaging said common axle from said stirring means for the condition that the stirring means encounters a predetermined magintude of resistance to rotation.

13. A stirring arrangement described in claim 1, 3, 4 or 6 wherein said coupling means comprises a gearing means for changing the rate of rotation of said first shaft to a predetermined rate of rotation for the stirring means.

14. A stirring arrangement described in claim 2, 3, 5 or 6 wherein said coupling means comprises a gearing means for changing the rate of rotation of said common axle to a predetermined rate of rotation for the stirring means.

15. A stirring arrangement described in claim 1, 2, 3, 4, 5 or 6 which further comprises a lip for interlocking said handle for said container with said handle for said lid.

* * * * *